Nov. 23, 1937.    L. SAIVES    2,099,867
BODY OF AUTOMOBILE VEHICLES
Original Filed Jan. 22, 1935    2 Sheets-Sheet 1
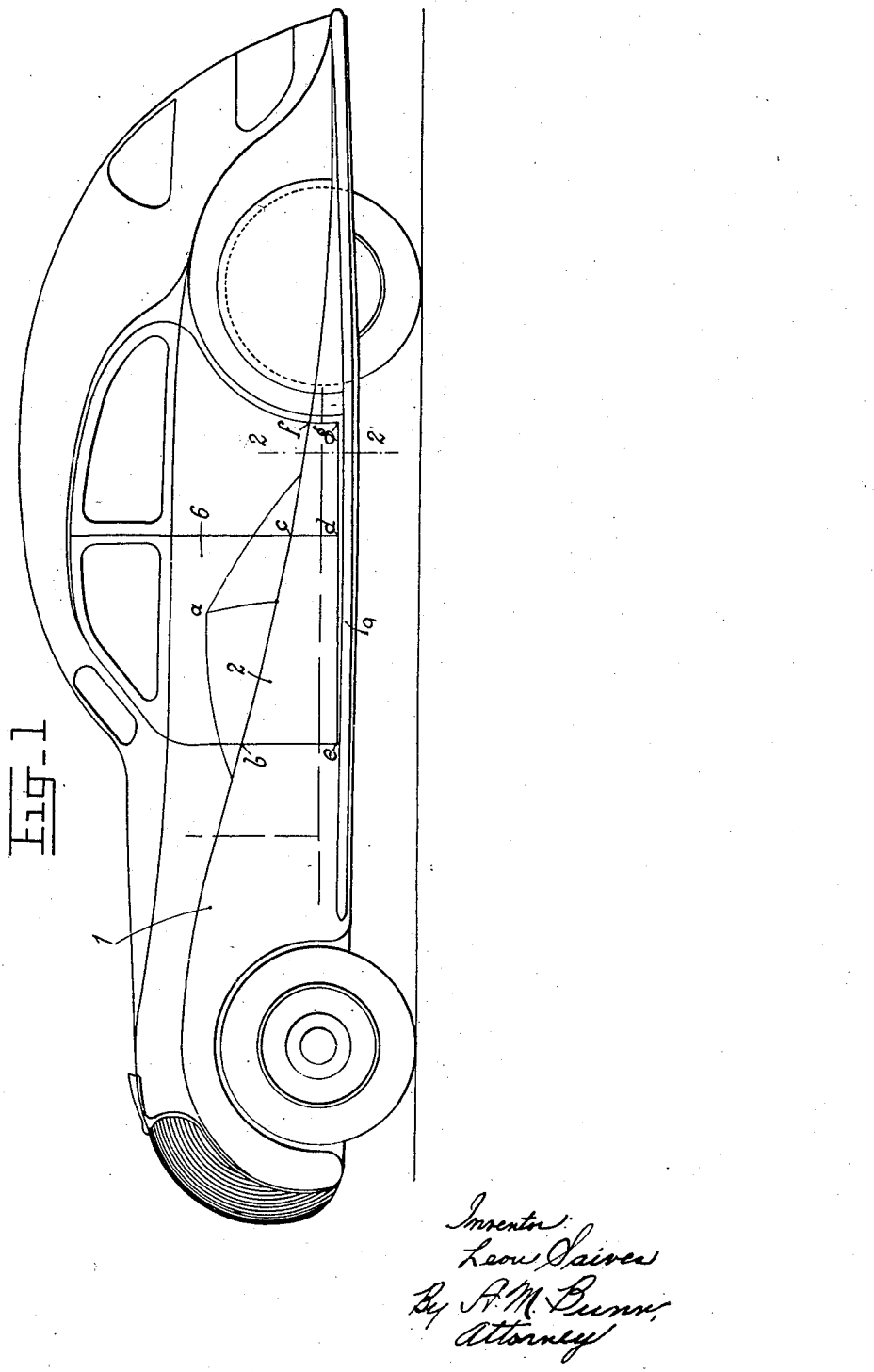

Nov. 23, 1937.  L. SAIVES  2,099,867
BODY OF AUTOMOBILE VEHICLES
Original Filed Jan. 22, 1935   2 Sheets-Sheet 2
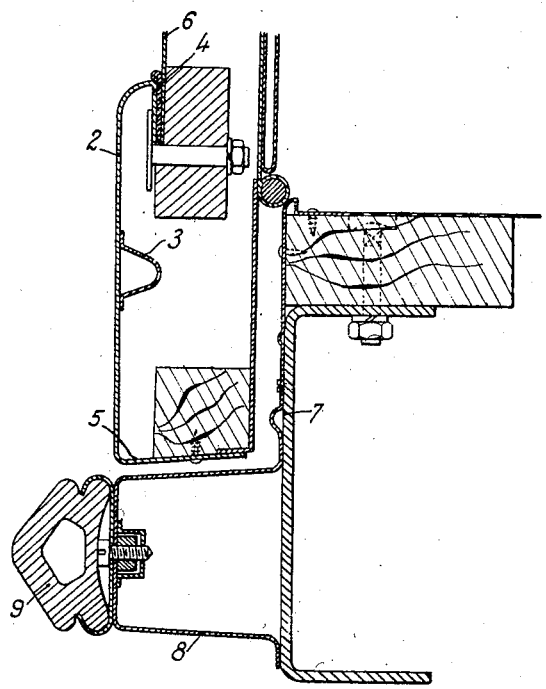

Patented Nov. 23, 1937

2,099,867

UNITED STATES PATENT OFFICE 2,099,867

BODY OF AUTOMOBILE VEHICLES

Leon Saives, Billancourt, France, assignor to Louis Renault, Billancourt, France Original application January 22, 1935, Serial No. 2,975. Divided and this application June 19, 1936, Serial No. 86,205. In France August 1, 1934

1 Claim. (Cl. 293—57)

The present invention relates to bodies of automobile vehicles and is more particularly applicable to bodies of the streamline type in which lateral footboards do not project out of the body.

According to the present invention, a lateral protection bumper or guard member rail is provided on the lower part of each side of the vehicle body. The lateral bumpers may be lengthened so as to form the rear bumpers.

In carrying out the invention the lateral guard members may be mounted below the doors on the exterior faces of the footboards which do not project outwardly of the doors when closed.

These lateral guard members may be elastic, pneumatic or provided with springs so that the guard members may yield to absorb the effects of a blow or shock.

The present application is a division of my application, Serial No. 2,975, filed January 22, 1935, now Patent No. 2,054,951.

One practical embodiment of the invention is given by way of example in the accompanying drawings, in which.

Fig. 1 is a side elevational view of an automobile vehicle, the body of which shows the improvements which are the object of the present invention.

Fig. 2 is a vertical cross-sectional view of the chassis frame, in the region of the front door, taken on line 2—2 of Figure 1.

Referring to the drawings the front mudguard or fender 1 is prolonged to the back end of the body following the line a. The shape of the mudguard is suitably chosen in order to allow a rational flow of the streamlines and thereby to diminish the resistance to movement of the vehicle. In the case of a body having four doors such as that represented in the drawings the sections b, c, d, e and c, d, g, f overlapping the doors and which join the front part of the mudguard to the back are formed from sheet metal casings secured to the lower part of the doors. Referring to Fig. 2, each casing is characterized by a piece of sheet metal 2 reinforced by a rib 3 and formed with an upper vertical part 4 and a lower horizontal part 5, which parts are secured on the door 6 itself by any suitable means. Beneath the doors, and secured on the frame side member 7 is the hollow casing 8 formed from sheet metal and projecting outwardly to approximately the same distance as the members 2.

According to the invention, on the lower part of the vehicle body and on the hollow external face of the casing 8 is mounted the lateral guard member rail 9 of an appropriate kind. This guard member may be elastic (for example made of rubber), pneumatic or provided with springs.

The casings 8 on either side of the vehicle serve as footboards when the doors are opened and the body is protected against lateral collisions by the rails 9. The members 2 may be made of stock sizes so that if they become destroyed they may easily be renewed. It is understood that the rails 9 may be lengthened so as to form the rear bumpers, or the rails may be joined with these latter.

I claim:

In a vehicle having a side frame member, a body and a fender member extending between the front and rear wheels of the vehicle secured to said body laterally thereof, a hollow casing secured to said frame member laterally thereof and forming a running board below said fender, the outermost face of said fender and the outermost face of said casing being substantially vertically aligned, and a bumper secured to and covering the aforementioned outermost face of said casing and projecting laterally therebeyond.

LEON SAIVES.